Oct. 24, 1950        C. ZURAS        2,527,473
RODENT TRAP
Filed March 25, 1946
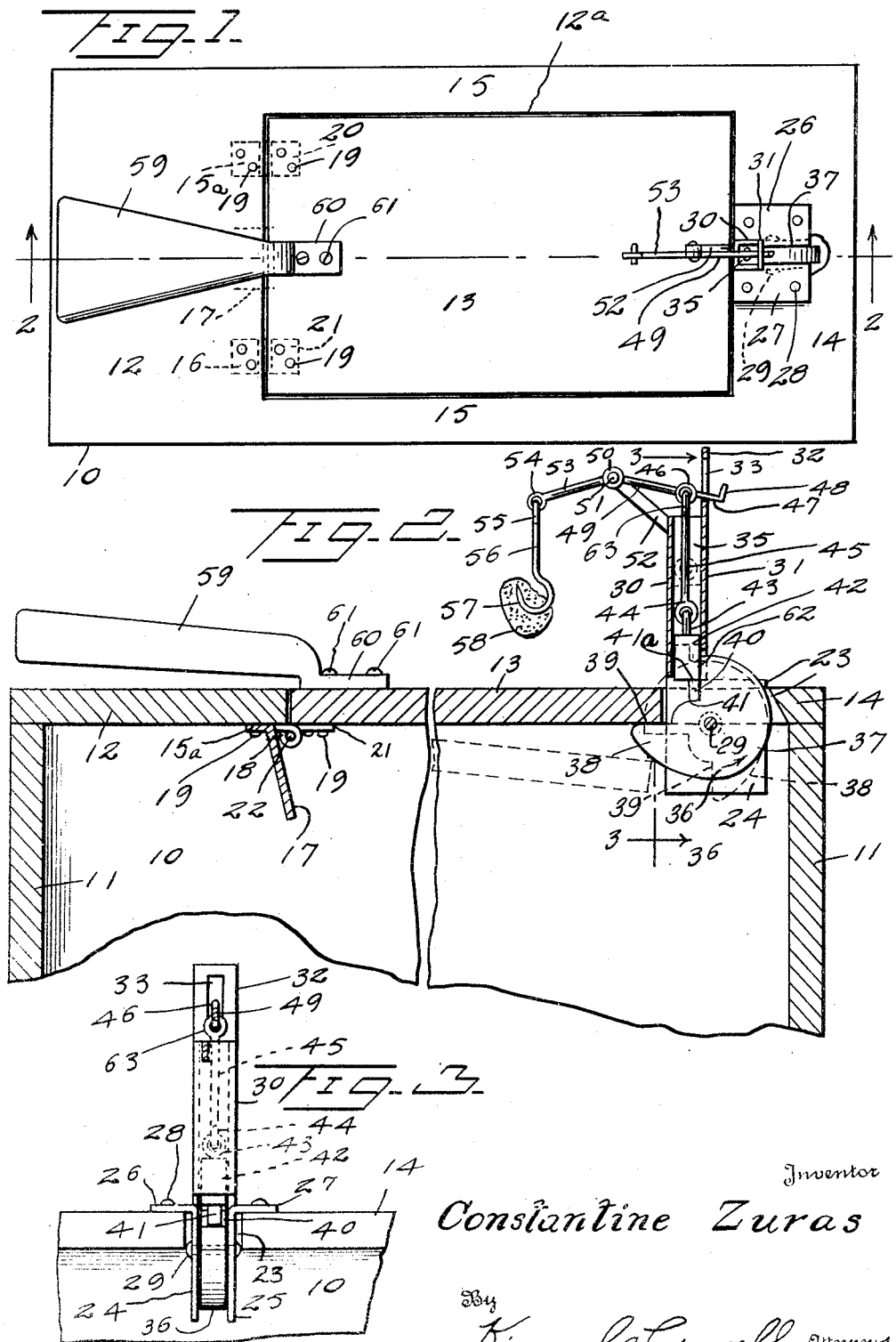
Inventor
Constantine Zuras
By
Kimmel & Crowell  Attorneys Patented Oct. 24, 1950

2,527,473

UNITED STATES PATENT OFFICE 2,527,473

RODENT TRAP

Constantine Zuras, Silver Spring, Md.

Application March 25, 1946, Serial No. 657,023

2 Claims. (Cl. 43—70)

The present invention relates to improvements in rodent traps and more particularly to an automatic self-resetting trap.

One of the objects thereof is to provide a simple and inexpensive rodent trap so shaped, arranged and designed that it will function automatically at all times when the actuating parts thereof are engaged by a rodent to imprison the latter, and further automatically operate itself, after the rodent has been imprisoned, to set itself so as to be ready for another operation, necessitating only placing of bait upon its bait holder.

A further object thereof is to provide a rodent trapping mechanism, all parts of which are rendered foolproof due to the circumstance that they all act in time with one another.

A still further object thereof is to provide a new form of rodent imprisioning trap wherein use is made of counterweights which function to set as well as reset the trap.

Another important object thereof is to provide, in a device of the character described, improved means for easing the release of the rodent trap door by requiring a minimum of frictional engagement between the various moving parts of the means for actuating the same.

A final object thereof is to provide, in a device of the kind described, improved means for suspendingly supporting the bait holder over the trap door of the device so it may have a universally free motion when engaged by a rodent.

With the above and other objects in view my invention consists in the combination, arrangement and details of construction disclosed in the drawings and specification, and then more particularly pointed out in the appended claims.

In the drawings, wherein similar reference characters designate similar parts throughout the respective views, Figure 1 is a top plan view of my invention, Figure 2 is a fragmental detail longitudinal section thereof, and Figure 3 is a fragmental elevation of the bait holding parts thereof.

Referring to the drawings, which are merely illustrative of my invention, the various parts thereof are detailed. It is designed to trap rodents such as rats and mice in the present apparatus by encasing them for the purpose of imprisoning them in a suitable receptacle so that the force employed in operating the movable parts thereof, instead of violently crushing the rodent to prevent its escape from the trap, is used to expeditiously deposit them into the interior of the receptacle, and as expeditiously to close the trap door after them.

In carrying this into effect, the case or box 10 is shown to have the imprisoning wall 11, and top 12, and a bottom, not shown. The top 12 of the case has a large opening over its effective area indicated at 12a, which is preferably rectangular. Adapted to bar or close this opening by fitting thereinto snugly is a trap door 13 also of rectangular construction, which door, in closed position, is flanked by the marginal strip portions 15 of the case top 12.

Opposite one end of the trap door 13 a part 14 of the top 12 of the case carries the control mechanism of the trap door. The trap door 13 is movably mounted upon the top of the case in such a manner that it may be dropped with its superincumbent rodent into the interior of the case at the time that the rodent engages the bait. A pair of oppositely arranged hinge plates 15a and 16 are attached by screws 19 to the under face of the top 12 of the case 10. A guide plate 17 projects at a slight forward inclination into the interior of the case centrally positioned between the hinges 15a and 16. The other set of cooperating hinge plates 20, 21 are also attached by screws to the under face of the trap door 13, the pintles which connect them to the hinge plates 15a and 16 being designated 22.

Formed centrally of the top portion 14 of the case 10 is a recess 23 into which extends downwardly into the case a pair of oppositely arranged bracket arms 24 and 25, whose right angular portions 26 and 27 are attached to the upper face of this portion of the case by screws or other fasteners 28. Spanning the bracket arms 24, 25 is a pivot pin 29, upon which is operatively and swivellably mounted a lever catch or latch 36 soon to be described.

The bracket arms 24 and 25 form part of a scaffold or frame which includes the integral upright guide member 30 preferably formed square in cross section, with its rear wall 31 projecting above the guide proper 30, being formed here with an elongated polygonal slot 33.

The catch 36 is shaped so as to be balanced upon the pivot pin 29 upon which it is mounted for swinging movement. This catch has its center of gravity so located that normally it occupies the position shown in Figure 2. The catch 36 is formed with a rounded portion 37 concentric with pivot pin 29, which curves symmetrically so as to join the stop arm 38 which is disposed between the pivot pin 29 and the lower point of the portion 37, in a manner to project diametrically opposite with respect to portion 37. The arm 38 has a straight edge or stop edge 39 which extends radially from the pivot pin 29 in a line that would bisect the curved portion 37 of the catch if produced to the periphery of the latter. The catch is also formed with another stop shoulder edge 40 in a plane at right angles to stop shoulder edge 39, approximately tangentially of the pivot pin 29 and on the same side relatively to pin 29 where stop shoulder arm 38 is located. A short curvilinear portion 41 of the periphery of this catch 36 joins the two stop shoulders.

For the purpose of latching the catch 36 in trap door holding position, I provide a weight 42, preferably square in cross section so as to be snugly guided for vertical movement in the guide 30 of the scaffold or frame. This weight 42 has formed thereupon an integral depending detent or lug 41a which engages flat against the stop shoulder edge 40 of the catch 36 in abutting relation thereagainst. This detent continues the straight edge 62 of the weight, so as to be with the latter slidably engageable with the adjacent wall of guide 30.

The weight 42 carries an eye 43, to which is linked an eye 44 formed at one end of a link arm 45, which has another eye 63 at its opposite end which is linked onto an eye 46 formed between the ends of a trip lever 49, of bell crank formation. This trip lever 49 has an integral angular arm 53, which has an eye 50 fulcrumed to swing upon a pivot pin 51 secured in an upwardly inclined bracket arm of the scaffold, designated 52. Another eye is formed at the outer end of this angular arm 52, at 54, to which is loosely linked the eye 55 of a swinging shank 56 which carries the bait holding hook 57. It will be seen that the trip lever operates just above the rectangular guide 30.

For the purpose of automatically restoring the trap door 13 to closed position, a counterweight is provided. This consists of a triangular shaped metal body 59 which tapers towards its inner end where it is formed with a rectangular lug 60 which is suitably attached by screws 61 to the trap door along a center line thereof. It will be observed that the major portion of the heft of this counterweight extends over the outer portion of the top 12 of the case.

In the use and operation of this trap the normal set position is that shown in Figure 2 wherein the trap door 13 is held in a horizontal position by the catch 38. When the rodent pulls on the bait, lever 53 will be rocked downwardly and lever 49 will be raised thereby raising weight 42 and releasing catch 38 so that trap door 13 under the weight of the rodent may swing downwardly to the dotted line position shown in Figure 2 wherein catch 38 is in substantially a vertical depending position. When the rodent drops off of trap door 13 this door is gravitatingly swung upwardly to a closed and set position by the weight 59. As door 36 swings upwardly the forward edge of this door will strike straight edge 40 of the catch which is in the path of the upward swinging of the door thereby rotating the catch clockwise until weight 42 drops downwardly in front of straight edge 40 to thereby lock the catch in its reset position. At the time the catch is in a released position this catch is held against rotation to the set position by frictional engagement of weight 42 on the curved edge 37 of the catch.

What I desire to claim is:

1. A rodent trap of the kind described comprising a case open at the top thereof, a trap door hingedly mounted on said case for closing said opening, a catch rockably mounted on said case, a shoulder on said catch engaging said trap door for supporting said door in closed position, a detent slidably mounted on said case engaging said catch for holding said catch against rotation, a bait supporting lever on said case, means operatively connecting said detent with said lever for sliding said detent from said catch upon rocking of said lever by a rodent, whereby the weight of the rodent effects rocking of said trap door for dropping the rodent into the case and rocking said catch to releasing position, a counterbalance weight on said trap door for returning the door to closed position, a shoulder on said catch engageable with said trap door upon swinging to closed position for rocking said catch back to door engaging position, and a weight on said detent biasing said detent back into engagement with said latter shoulder for resetting the trap.

2. A rodent trap of the kind described comprising a case open at the top thereof, a trap door hingedly mounted on said case for closing said opening, a catch rockably mounted on said case, a shoulder on said catch engaging said trap door for suuporting said door in closed position, a detent slidably mounted on said case engaging said catch for holding said catch against rotation, a bait supporting lever on said case, means operatively connecting said detent with said lever for sliding said detent from said catch upon rocking of said lever by a rodent, whereby the weight of the rodent effects rocking of said trap door for dropping the rodent into the case, and rocking said catch to releasing position, means for returning the door to closed position, a shoulder on said catch engageable with said trap door upon swinging to closed position for rocking said catch back to door engaging position, and means biasing said detent back into engagement with said latter shoulder for resetting the trap.

CONSTANTINE ZURAS.

REFERENCES CITED

The following references are of record in the file of this patent:

UNITED STATES PATENTS

| Number | Name | Date |
| --- | --- | --- |
| 688,770 | Cannon | Dec. 10, 1901 |
| 1,463,874 | Croyle | Aug. 7, 1923 |
| 1,831,688 | Snider | Nov. 10, 1931 |